(12) United States Patent
Trase et al.

(10) Patent No.: US 10,632,828 B1
(45) Date of Patent: Apr. 28, 2020

(54) FLYWHEEL PULSE AND GLIDE SYSTEM FOR VEHICLES

(71) Applicant: U.S.A. as represented by the Administrator of the National Aeronautics and Space Administration, Washington, DC (US)

(72) Inventors: Larry M. Trase, Litchfield, OH (US); Ralph H. Jansen, Westlake, OH (US); Peter E. Kascak, Cleveland, OH (US)

(73) Assignee: United States of America as Represented by the Administrator of National Aeronautics and Space Administration, Washington, DC (US)

(*) Notice: Subject to any disclaimer, the term of this patent is extended or adjusted under 35 U.S.C. 154(b) by 2108 days.

(21) Appl. No.: 13/853,308

(22) Filed: Mar. 29, 2013

Related U.S. Application Data

(60) Provisional application No. 61/621,766, filed on Apr. 9, 2012.

(51) Int. Cl.
| | |
|---|---|
| *B60K 6/10* | (2006.01) |
| *B60K 6/30* | (2007.10) |
| *B60W 30/18* | (2012.01) |
| *B60K 6/442* | (2007.10) |
| *B60K 6/485* | (2007.10) |
| *B60K 6/48* | (2007.10) |
| *B60W 10/06* | (2006.01) |

(52) U.S. Cl.
CPC ............... *B60K 6/10* (2013.01); *B60K 6/105* (2013.01); *B60K 6/30* (2013.01); *B60K 6/442* (2013.01); *B60K 6/48* (2013.01); *B60K 6/485* (2013.01); *B60W 10/06* (2013.01); *B60W 30/18127* (2013.01); *B60L 2240/44* (2013.01)

(58) Field of Classification Search
CPC . B60K 6/10; B60K 6/105; B60K 6/30; B60K 6/442; B60K 6/48; B60K 6/485; B60L 11/16; B60L 2240/44; B60W 30/18127; B60W 10/06
USPC .......... 180/165, 65.265, 65.23, 65.25, 65.28; 280/217
See application file for complete search history.

(56) References Cited

U.S. PATENT DOCUMENTS

| | | |
|---|---|---|
| 3,771,311 A | 11/1973 | Herbst |
| 3,870,116 A | 3/1975 | Seliber |
| 4,393,964 A | 7/1983 | Kemper |
| 5,168,975 A | 12/1992 | Bernhardt et al. |
| 5,415,245 A | 5/1995 | Hammond |
| 6,170,587 B1 | 1/2001 | Bullock |
| 7,478,693 B1 | 1/2009 | Curtis |
| 7,588,108 B2 | 9/2009 | Miyao |
| 7,597,164 B2 | 10/2009 | Severinsky et al. |
| 7,654,355 B1 | 2/2010 | Williams |
| 8,340,884 B1 | 12/2012 | He et al. |
| 2010/0082192 A1 | 4/2010 | Hofbauer |

(Continued)

*Primary Examiner* — David H Bollinger
(74) *Attorney, Agent, or Firm* — Robert H. Earp, III (57) ABSTRACT

A prime mover is combined with a flywheel storage device and a control system to implement a flywheel pulse and glide system in a vehicle. In one embodiment, the control system is configured to cycle power delivery between the prime mover and the flywheel storage device to power the vehicle. The prime mover, when activated by the control system, is configured to power the vehicle and spin up the flywheel storage device to capture a sufficient amount of energy.

16 Claims, 6 Drawing Sheets

(56) References Cited

U.S. PATENT DOCUMENTS

| | | |
|---|---|---|
| 2010/0152982 A1 | 6/2010 | Bowman et al. |
| 2010/0280712 A1* | 11/2010 | Bowman .............. B60K 6/105 |
| | | 701/36 |
| 2011/0106359 A1* | 5/2011 | Tanaka ................ B60K 6/105 |
| | | 701/22 |
| 2011/0114406 A1 | 5/2011 | Gibson et al. |
| 2012/0197472 A1 | 8/2012 | He et al. |
| 2012/0268077 A1 | 10/2012 | Kumar |

* cited by examiner

FLYWHEEL PULSE AND GLIDE SYSTEM FOR VEHICLES

CROSS-REFERENCE TO RELATED APPLICATION

This application claims the benefit of U.S. Provisional Patent Application No. 61/621,766, filed on Apr. 9, 2012. The subject matter of this earlier filed provisional patent application is hereby incorporated by reference in its entirety.

ORIGIN OF THE INVENTION

The invention described herein was made by an employee of the United States Government and may be manufactured and used by or for the Government for Government purposes without the payment of any royalties thereon or therefore.

FIELD

The present invention relates to pulse and glide system for vehicles and, more particularly, to a pulse and glide technique for vehicles using a flywheel.

BACKGROUND

Current electric hybrid vehicles (hereinafter "vehicles") provide significant improvements in gas mileage over conventional vehicles by using an energy storage system in the form of chemical batteries to provide acceleration to the vehicle via an electric motor that offloads the energy from an internal combustion engine (hereinafter "ICE"). The energy storage system allows the recovery of the energy used to decelerate the vehicle. This improvement in gas mileage performance is greatest in driving conditions that involve continuous acceleration and deceleration of the vehicle, e.g., in congested traffic conditions.

If the energy storage can be used to cycle the ICE on and off during long periods of constant speed, an additional significant improvement of gas mileage could be achieved. However, this pulse and glide driving method drastically increases the cycle requirements for the energy storage. Energy storage, such as chemical batteries, generally cannot tolerate the higher cycle requirements necessary to implement automatic pulse and glide techniques. Further, the shortened lifetime of the chemical batteries and the high replacement costs generally prevent the use of chemical batteries for such an application. Thus, an improved flywheel pulse and glide system for vehicles may be beneficial to meet the cycle requirements.

SUMMARY

Certain embodiments of the present invention may provide solutions to the problems and needs in the art that have not yet been fully identified, appreciated, or solved by current pulse and glide systems. For example, some embodiments pertain to a pulse and glide system using a flywheel.

In accordance with one embodiment of the present invention, a computer-implemented method is provided. The computer-implemented method includes switching, by a control system, power delivery from an internal combustion engine to a flywheel to maintain a speed of a vehicle, and switching, by the control system, power delivery from the flywheel to the internal combustion engine to maintain the speed of the vehicle and increase rotational speed, and therefore energy, of the flywheel when the energy of the flywheel is sufficiently reduced. The switching power delivery, by the control system, between the engine and the flywheel storage device is performed in cycles.

In another embodiment of the present invention, an apparatus is provided. The apparatus includes a control system configured to alternate power delivery between an engine and a flywheel storage device to power a vehicle. The engine, when activated by the control system, is configured to power the vehicle and increase a rotational speed of the flywheel storage device until the flywheel storage device captures a sufficient amount of energy.

In yet another embodiment of the present invention, an apparatus is provided. The apparatus includes at least one processor and memory having a control application. The control application, with the at least one processor, are configured to cause the apparatus to alternate power delivery between an engine and a flywheel storage device to power a vehicle. The engine, when activated by the apparatus, is configured to power the vehicle and spin up the flywheel storage device until the flywheel storage device captures a sufficient amount of energy.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

A demonstrated method to increase the gas mileage of automobiles by 40% to 100% is using a driving technique commonly referred to as "pulse and glide." The method presents the greatest increase in gas mileage when applied to hybrid electric vehicles designed to efficiently disengage the ICE from the transmission and turn the engine off. Currently, the pulse and glide technique is implemented manually by a driver and requires a constant acceleration and deceleration cycle of approximately 0 to 30 seconds. A modification of the control system for a hybrid electric vehicle in conjunction with using energy storage in accordance with some embodiments of the present invention would enable the automation of the pulse and glide technique and provide a constant forward speed while alleviating the distraction of requiring a driver to manually implement the pulse and glide technique. The conventional energy storage devices currently used are chemical batteries. While chemical batteries provide the necessary power and energy, they are significantly constrained by low cycle life, low tolerance to deep discharges, and long recharge times.

The embodiments described herein utilize an energy storage method using a low loss, high cycle life, magnetically suspended flywheel energy storage device. This device provides the power and energy requirements to implement a pulse and glide technique without suffering from the drawbacks of chemical batteries. The pulse and glide flywheel technique presents an economical, long life method that dramatically improves the gas mileage performance of vehicles using internal combustion engines.

Thus, one or more embodiments of the present invention pertain to a pulse and glide system that combines a prime mover, such as an internal combustion engine, gas turbine engine, fuel cell engine, Stirling cycle engine, Brayton cycle heat engine, etc., with a flywheel energy storage system and a control system in a transportation application. Stated differently, the pulse and glide system combines a prime mover with a flywheel energy storage system to improve the fuel efficiency of a transportation vehicle, such as a car, truck, bus, or train.

The flywheel technology described herein allows for improvement in the ratio of the power of the prime mover versus the power rating of the energy storage system. Optimization of this ratio provides additional improvements in fuel conservation. Increasing the energy storage also enables alternatives to the ICE to be used as the primary power producing element.

Figure 1:
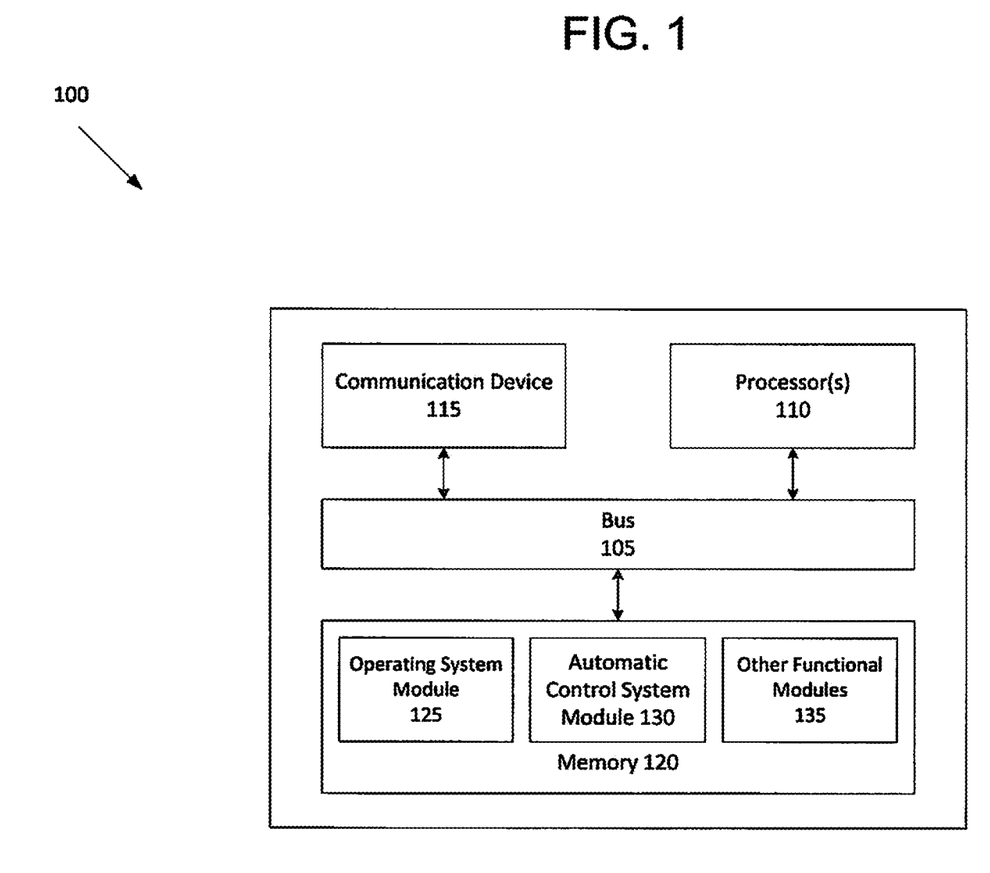
FIG. 1 is a block diagram illustrating a computing system configured to implement a pulse and glide technique, according to an embodiment of the present invention.

FIG. 1 is a block diagram illustrating a computing system 100 configured to implement a pulse and glide technique, according to an embodiment of the present invention. Computing system 100 includes a bus 105 or other communication mechanism that can communicate information and at least one processor 110, coupled to bus 105, that can process information. At least one processor 110 can be any type of general or specific purpose processor. Computing system 100 also includes memory 120 that can store information and instructions to be executed by at least one processor 110. Memory 120 can be comprised of any combination of random access memory ("RAM"), read only memory ("ROM"), static storage such as a magnetic or optical disk, or any other type of computer readable medium. Computing system 100 also includes a communication device 115, such as a network interface card, that may provide access to a network.

The computer readable medium may be any available media that can be accessed by at least one processor 110. The computer readable medium may include both volatile and nonvolatile medium, removable and non-removable media, and communication media. The communication media may include computer readable instructions, data structures, program modules, or other data and may include any information delivery media.

According to an embodiment, memory 120 may store software modules that may provide functionality when executed by at least one processor 110. The modules can include an operating system 125 and an automatic control system (control application) module 130, as well as other functional modules 135. Operating system 125 may provide operating system functionality for computing system 100. Automatic control system module 130 may control the pulse and glide technique for the vehicle. Because computing system 100 may be part of a larger system, computing system 100 may include one or more additional functional modules 135 to include the additional functionality.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 2:
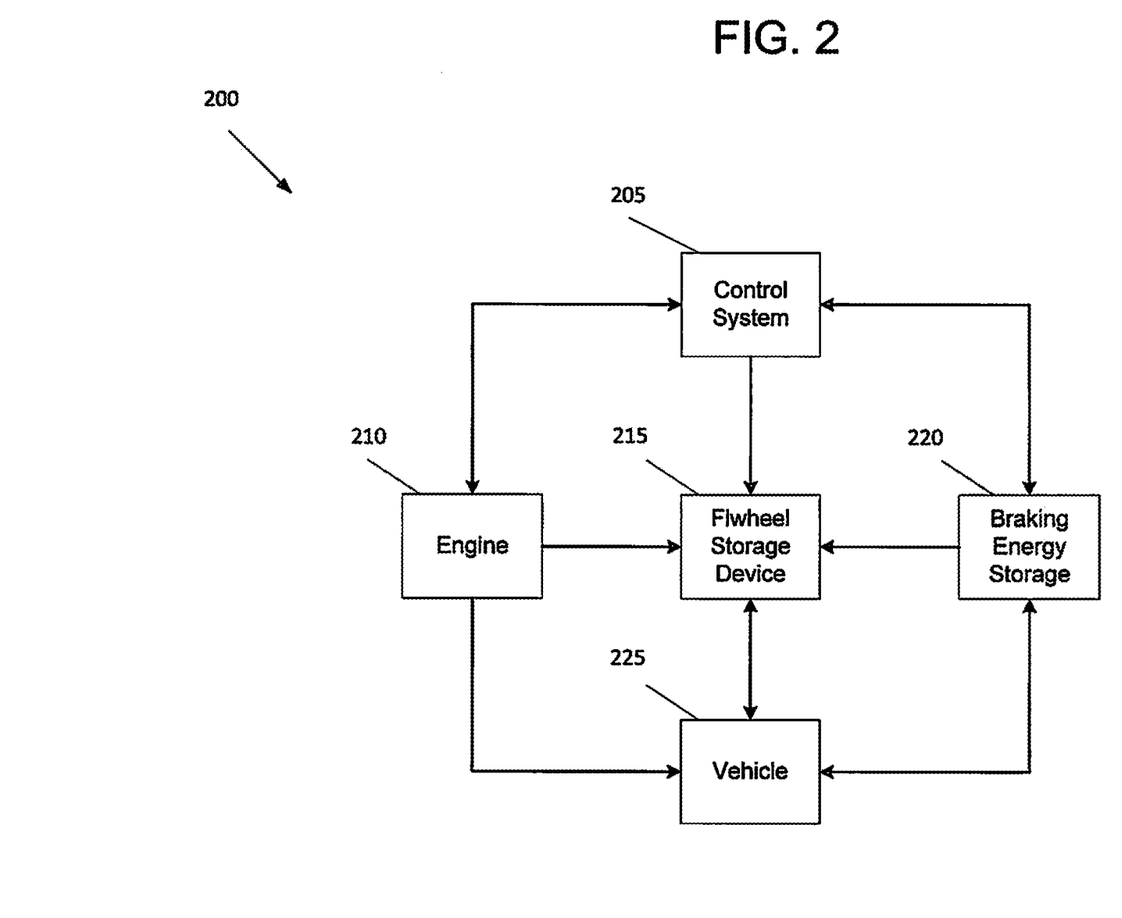
FIG. 2 is a block diagram illustrating a pulse and glide system, according to an embodiment of the present invention.

FIG. 2 is a block diagram illustrating a pulse and glide system 200, according to an embodiment of the present invention. In this embodiment, an engine 210 is configured to provide power using gas or another combustible fuel source to power (or propel) vehicle 225, as well as spin up flywheel storage device 215 to capture a sufficient amount of energy, e.g., fully recharge flywheel storage device 215. Flywheel storage device 215 in this embodiment should improve the overall performance of an all-electric (battery) vehicle. Flywheel storage device 215 may be configured to handle most of the transient loads of vehicle 225, allowing for a more constant charge/discharge rates than chemical batteries, extending the life and performance of the batteries. A control system 205, such as that shown in FIG. 1, is configured to implement the pulse and glide technique such that power delivered by engine 210 and flywheel storage device 215 are cycled to power vehicle 225. In certain embodiments, the time of operation of flywheel storage device 215 may be dependent on the energy storage capability of flywheel storage device 215, the driving conditions, etc. For example, flywheel storage device 215, when having a sufficient amount of energy, may power vehicle 225 until the energy is sufficiently reduced to approximately one-third of the total energy storage capability of the flywheel, or reduced to any amount of energy that would be appreciated by a person of ordinary skill in the art. Thereafter, engine 210 may be activated to power the vehicle 225 until flywheel storage device 215 is spun up to a sufficient rotational speed, such that flywheel storage device 215 includes a sufficient amount of energy to power vehicle 225. This cycle may be performed repeatedly during operation of the vehicle.

By using flywheel storage device 215 in this embodiment, equal gains in cruising mileage to engine 210 are achieved. This allows vehicle 225 to maintain speed during travel. Flywheel storage device 215 in this embodiment is a low loss, high cycle life, magnetically suspended flywheel energy storage device that can provide power and energy to implement the pulse and glide technique without suffering the drawbacks of chemical batteries. It should also be noted that flywheel storage device 215 is capable of frequent full charge and discharge cycles at full power.

Flywheel storage device 215 may use a magnetically suspended rotating mass (not shown) to store and release electrical energy via an electrical motor (also not shown). Flywheel storage device 215 is immune to the effects of high life cycle and constant rapid charge and discharge cycles, increasing the life of flywheel storage device 215.

In one embodiment, engine 210 may be larger in size, and have a larger amount of horsepower, than flywheel storage device 215. This may allow engine 210 to be shut off for seconds to minutes at a time each cycle.

During operation of vehicle 225, control system 205 may activate engine 210 to run at full power to simultaneously power vehicle 225 and increase the rotational speed of flywheel storage device 215 at a more rapid rate until a sufficient amount of energy is captured by flywheel storage device 215. When control system 205 detects that energy in flywheel storage device 215 is sufficient to power vehicle 225, control system 205 may activate, and switch power to, flywheel storage device 215. Control system 205 may also deactivate, or fully turn off, engine 210. This may allow flywheel storage device 215 to increase, or maintain, the speed of vehicle 225 until the energy in flywheel storage device 215 is sufficiently reduced. For example, if a driver turns on vehicle 225, and control system 205 detects that flywheel storage device 215 contains a sufficient amount of energy, control system 205 may activate, and switch power delivery to, flywheel storage device 215, such that flywheel storage device 215 is configured to power vehicle 225.

When control system 205 detects that the energy in flywheel storage device 215 is sufficiently reduced (e.g., one-third of full energy rating), control system 205 may deactivate flywheel storage device 215, and activate, and switch power delivery from the, engine 210. It should be appreciated that rather than operating engine 210 at partial power, engine 210 may be operated at full power to increase rotation of flywheel storage device 215 rapidly while simultaneously powering vehicle at the optimum efficiency region of the engine 225. This allows flywheel storage device 215 to be spun up to store and recapture energy while vehicle 215 is in motion. By using this technique, the efficiency of engine 210 can be optimized as flywheel storage device 215 can power the vehicle to maintain or increase the speed of vehicle 225. The spin up rate of flywheel storage device 215 may be modified to optimize, improve engine 210 performance.

By turning engine 210 on and off, engine 210 may operate primarily in its most optimal region of efficiency It should also be noted that flywheel storage device 215 may be configured to recover much higher portions of the braking energy. For example, when vehicle 225 decelerates (e.g., brakes), the energy obtained from braking can be collected in a braking energy storage device 220. Control system 205 may then divert energy collected in braking energy storage device 220 to flywheel storage device 215. In another embodiment, when an operator of vehicle 225 applies the brakes, the energy obtained from braking may be directly recovered by flywheel storage device 215. It should be appreciated that flywheel storage device 215 in this embodiment is configured to recover more of the braking energy than is possible with other types of batteries, such as chemical batteries. For example, chemical batteries have limitations on the rate that the energy is recovered.

In another embodiment, flywheel storage device 215 may be larger in size, and provide greater amount of horsepower, than engine 210. This may allow engine 210 to be shut off for longer periods of time and for a longer distance during each cycle. By having a larger flywheel storage device 215, the size and mass of engine 210 can be reduced. This allows for more non-traditional engines, such as Stirling, Brayton, gas turbine, fuel cells, etc., to be used. Further, these non-traditional engines may have better efficiency and lower mass than typical internal combustion engines.

Figure 3:
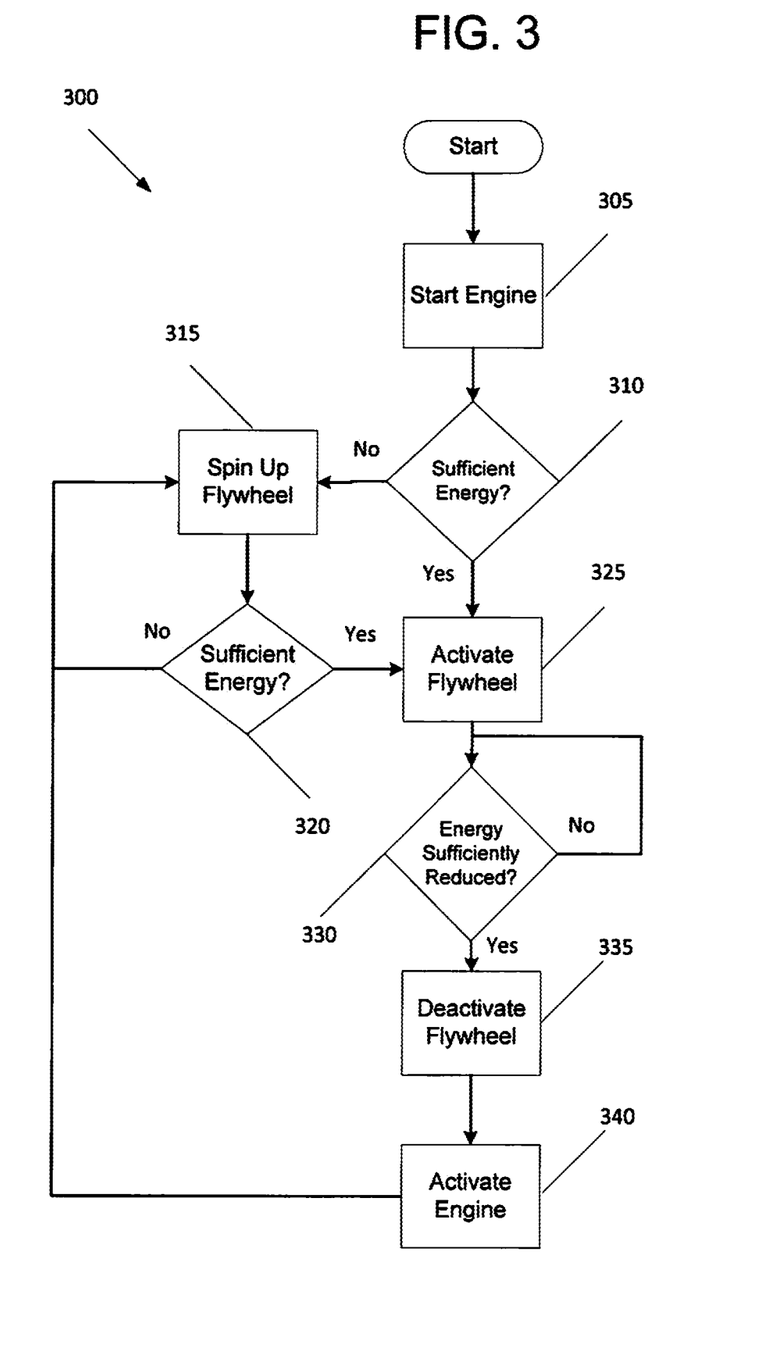
FIG. 3 is a flow diagram illustrating a process for pulse and glide, according to an embodiment of the present invention.

FIG. 3 is a flow diagram 300 illustrating a process for pulse and glide, according to an embodiment of the present invention. The process described herein may be executed by, for example, computing system 100 of FIG. 1. In this embodiment, the process may use a flywheel energy storage device (hereinafter "flywheel") with an engine in a vehicle. The horsepower of the engine and the horsepower of the flywheel may vary depending on the vehicle configuration.

The process begins with the computing system at 305 activating the engine to power the vehicle and cause the engine to spin up the flywheel. At 310, the computing system may determine whether a sufficient amount of energy is contained in the flywheel. If the flywheel contains an insufficient amount of energy to power the vehicle, the computing system at 315 continues to maintain power of the engine to allow the flywheel to spin up further. At 320, the computing system determines whether the flywheel contains a sufficient amount of energy. If the flywheel still contains an insufficient amount of energy, the computing system continues to cause the engine to spin up the flywheel at 315 while powering the vehicle.

If it is determined at 310, or at 320, that the energy of the flywheel is sufficient, the computing system may deactivate the engine and activate the flywheel at 325 to allow the flywheel to power the vehicle. The amount of energy deemed sufficient for a flywheel depends on the flywheel rotor materials and the physical size of the flywheel. The computing system at 330 continues to monitor whether the rotational speed of the flywheel is sufficiently reduced.

When the computing system detects that the amount of energy the flywheel is reduced to a nominal amount, the computing system at 335 deactivates the flywheel, and activates at 340 the engine in order to spin up the flywheel at 315 to recapture the energy while powering the vehicle. This may be a continuous process until the vehicle is shut off, and may allow for a more efficient use of the engine.

The steps shown in FIG. 3 may be performed, in part, by a computer program, encoding instructions for a nonlinear adaptive processor to cause at least the process described in FIG. 3 to be performed by the apparatuses discussed herein. The computer program may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the process described in FIG. 3, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

Figure 4:
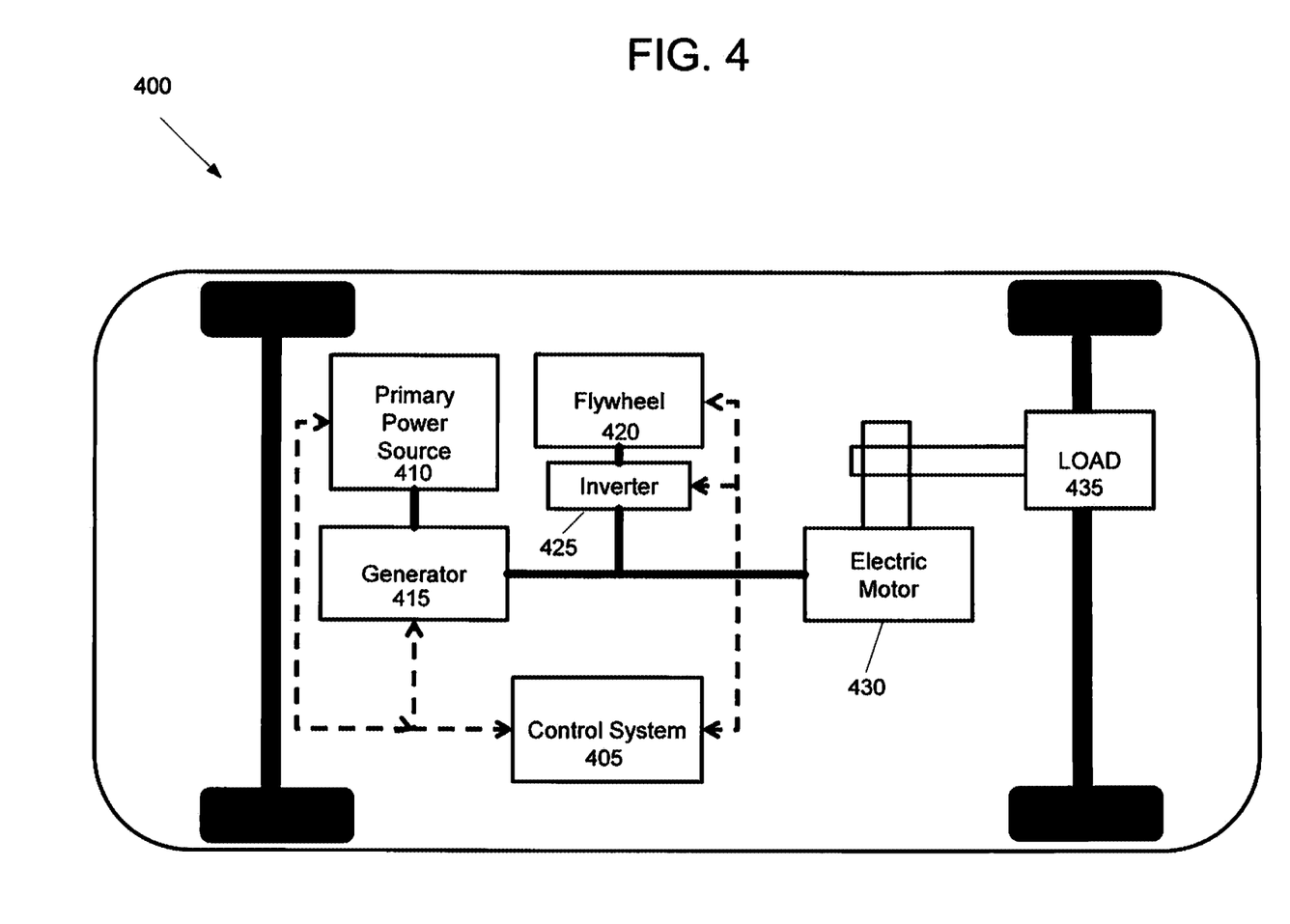
FIG. 4 is a block diagram illustrating a pulse and glide system for an electric vehicle, according to an embodiment of the present invention.

FIG. 4 is a diagram 400 illustrating a pulse and glide system for an electric vehicle, according to an embodiment of the present invention. Because the vehicle in FIG. 4 is an electric vehicle, primary power source 415 in this embodiment may be an electric vehicle battery, a traction battery, or any power source that would be appreciated by a person of ordinary skill in the art.

Similar to FIG. 1, the vehicle includes a control system 405 that is configured to cycle power delivery between a primary power source 410 and flywheel 420. When control system 405 switches primary power source 410 to full power, primary power source 410, together with generator 415, is configured to cause flywheel 420 to capture energy, as well as provide power to the vehicle. For instance, primary power source 410, together with generator 415, may provide power to electric motor 430, allowing power to be supplied to load 435 propelling the vehicle.

To change power delivery to flywheel 420, control system 405 is configured to switch inverter to an "on" state, allowing flywheel 420 to delivery power to electric motor. As discussed above, control system 405 may switch power delivery to flywheel 420 when the energy stored in flywheel 420 is sufficient to power the vehicle.

Figure 5:
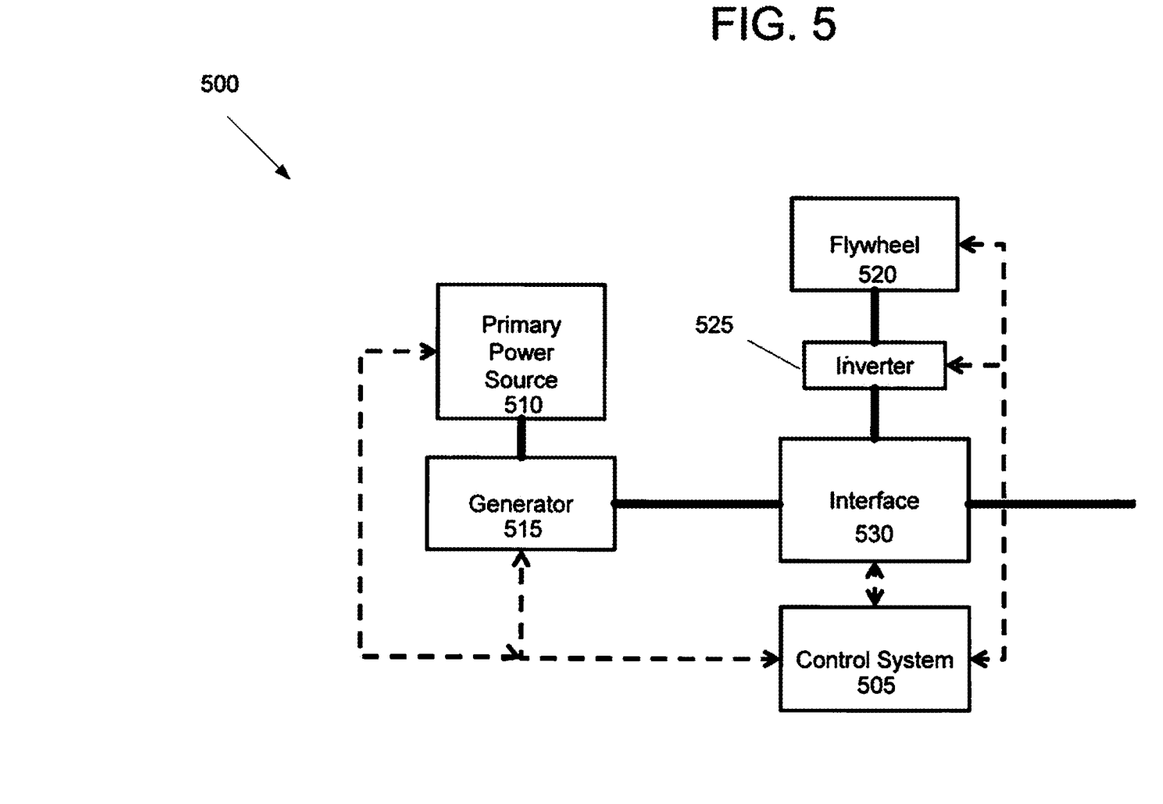
FIG. 5 is a block diagram illustrating a pulse and glide system for non-electric vehicle, according to an embodiment of the present invention.

FIG. 5 is a diagram 500 illustrating a pulse and glide system for non-electric vehicle, according to an embodiment of the present invention. Because the vehicle in this embodiment is a non-electric vehicle, primary power source 510 may be an internal combustion engine, a gas turbine engine, a fuel cell engine, a Stirling cycle engine, a Brayton cycle heat engine, or any type of power source that would be appreciated by a person of ordinary skill in the art.

To implement the pulse and glide system in the non-electric vehicle, an interface 530 is provided. Interface 530 is connected to primary power supply 510 via generator 515 and to flywheel 520 via inverter 525. Similar to FIGS. 1 and 4, control system 505 may cycle power delivery between primary power source 510 and flywheel 520 to power, and reduce gas consumption of, the vehicle in a more efficient manner.

Figure 6:
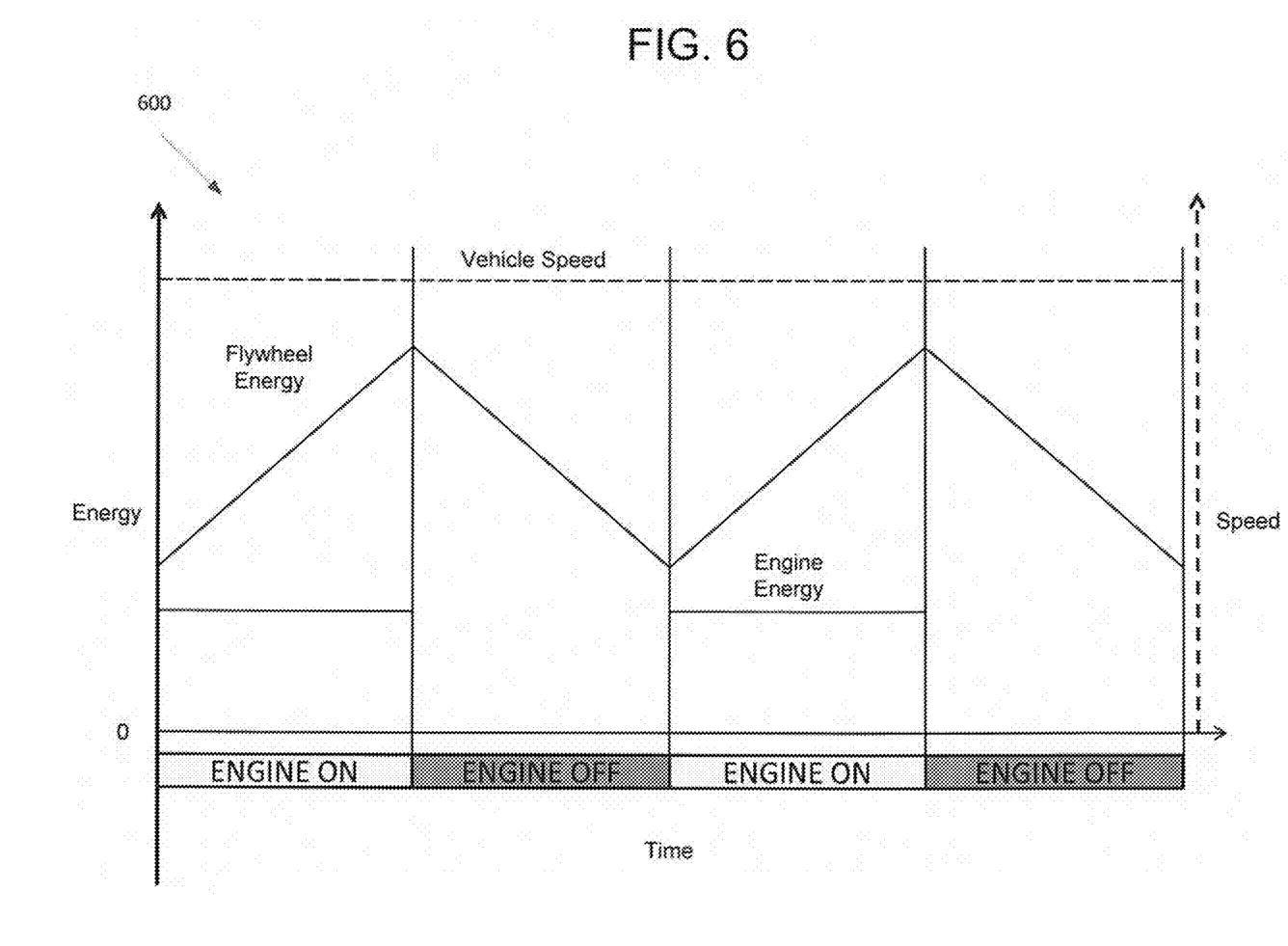
FIG. 6 is a graph illustrating time versus energy for a pulse and glide system, according to an embodiment of the present invention.

FIG. 6 is a graph 600 illustrating time versus energy for a pulse and glide system, according to an embodiment of the present invention. In graph 600, when the engine is turned on at full power, the engine is configured to power the vehicle, as well as increase the energy stored in the flywheel. When the flywheel stores a sufficient amount of energy, the engine is turned off and the flywheel is turned on. The flywheel, as shown in graph 600, is operated until the energy stored in flywheel is insufficient to power the vehicle. As illustrated in FIG. 6, this cycle is continuously repeated until the vehicle is turned off, One or more embodiments of the present invention pertain to a pulse and glide system that combines the primary mover with a mechanical energy storage device to increase the efficiency of a transportation vehicle. This system includes a pulse application of the primary mover that operates in two states—e.g., "off" or "on", with the preferred "on" state being the optimal efficiency power supply. This system also includes a size of the energy storage device and the power rating of that device to allow the prime mover to be made smaller for the transportation application. The system may also include the recovery of braking energy to augment the system. An embodiment of this system couples the flywheel energy storage system to the transportation drive train electrically. In an alternate embodiment, the system couples the flywheel energy storage system to the transportation drive train mechanically.

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
switching, by a control system, power delivery from an engine to a flywheel storage device to maintain a speed of a vehicle; and
switching, by the control system, power delivery from the flywheel storage device to the engine to maintain the speed of the vehicle and increase rotational speed of the flywheel storage device when the energy of the flywheel storage device is reduced below a threshold energy, wherein the threshold energy is independent of the speed of the vehicle and based on a storage capacity of the flywheel storage device, wherein
the switching power delivery between the engine and the flywheel storage device is performed in cycles.

2. The computer-implemented method of claim 1, further comprising:
diverting power, by the control system, captured by a braking system to spin up the flywheel storage device to recover energy when the vehicle decelerates.

3. The computer-implemented method of claim 1, further comprising:
determining, by the control system, whether the flywheel storage device comprises a sufficient amount of energy to power the vehicle.

4. The computer-implemented method of claim 3, further comprising:
deactivating, by the control system, the engine to reduce an amount of fuel used by the vehicle in response to the determining that the flywheel storage device comprises the sufficient energy to power the vehicle.

5. The computer-implemented method of claim 4, further comprising:
activating, by the control system, the flywheel storage device to provide power to the vehicle such that the speed of the vehicle in maintained after deactivating the engine.

6. The computer-implemented method of claim 1, further comprising:
activating, by the control system, the engine when the energy from the flywheel storage device is reduced below the threshold energy.

7. The computer-implemented method of claim 6, further comprising:
deactivating, by the control system, the flywheel storage device when the energy from the flywheel storage device is reduced below the threshold energy.

8. An apparatus, comprising:
a control system configured to cycle power delivery between an engine and a flywheel storage device to maintain a speed of a vehicle, wherein the control system is configured to:
activate the engine to power the vehicle and increase a rotational speed of the flywheel storage device until the flywheel storage device captures a sufficient amount of energy to power the vehicle; and
deactivate the engine upon the flywheel storage device capturing the sufficient amount of energy and power the vehicle via the flywheel storage device until the flywheel possesses an energy amount below an energy threshold, wherein the energy threshold is independent of the speed of the vehicle and based on a storage capacity of the flywheel storage device.

9. The apparatus of claim 8, wherein the engine, when activated, is configured to operate at full power to simultaneously power the vehicle and spin up the flywheel storage device to allow the flywheel storage device to capture the sufficient amount of energy.

10. The apparatus of claim 8, further comprising:
a braking energy storage device configured to spin up the flywheel storage device causing the flywheel storage device to capture energy when the vehicle decelerates.

11. The apparatus of claim 10, wherein the braking energy storage device is further configured to capture the energy when the vehicle decelerates.

12. An apparatus, comprising:
at least one processor; and
memory comprising a control application, wherein
the control application, with the at least one processor, are configured to maintain a speed of a vehicle by
activating, when an energy amount of a flywheel storage device of the vehicle is below an energy threshold, a previously deactivated engine to power the vehicle and spin up the flywheel storage device until the flywheel storage device captures a sufficient amount of energy to independently power the vehicle, wherein the energy threshold is independent of the speed of the vehicle and based on a storage capacity of the flywheel storage device.

13. The apparatus of claim 12, wherein the control application, together with the at least one processor, are further configured to cause the apparatus to activate the flywheel storage device when the flywheel storage device comprises the sufficient amount of the energy.

14. The apparatus of claim 13, wherein the control application, together with the at least one processor, are further configured to cause the apparatus to deactivate the engine when the flywheel storage device comprises the sufficient amount of energy.

15. The apparatus of claim 12, wherein the control application, together with the at least one processor, are further configured to cause the apparatus to activate the engine at full power to simultaneously power the vehicle and spin up the flywheel storage device to capture the sufficient amount of energy.

16. The apparatus of claim 12, wherein the control application, together with the at least one processor, are further configured to cause the apparatus to instruct a braking energy storage to spin up the flywheel storage device to capture regenerative energy when the vehicle decelerates.

* * * * *